US011214261B2

(12) United States Patent
Bluvstein et al.

(10) Patent No.: US 11,214,261 B2
(45) Date of Patent: Jan. 4, 2022

(54) LEARN ASSOCIATION FOR MULTI-OBJECT TRACKING WITH MULTI SENSORY DATA AND MISSING MODALITIES

(71) Applicant: GM GLOBAL TECHNOLOGY OPERATIONS LLC, Detroit, MI (US)

(72) Inventors: Max Bluvstein, Herzliya (IL); Shaul Oron, Rehovot (IL); Bat El Shlomo, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 309 days.

(21) Appl. No.: 16/437,317

(22) Filed: Jun. 11, 2019

(65) Prior Publication Data
US 2020/0391750 A1    Dec. 17, 2020

(51) Int. Cl.
*B60W 40/04* (2006.01)
*G06K 9/62* (2006.01)
*G05D 1/02* (2020.01)
*G06K 9/00* (2006.01)

(52) U.S. Cl.
CPC ........... *B60W 40/04* (2013.01); *G05D 1/0238* (2013.01); *G06K 9/00805* (2013.01); *G06K 9/6289* (2013.01); *G06K 9/6293* (2013.01)

(58) Field of Classification Search
None
See application file for complete search history.

(56) References Cited

U.S. PATENT DOCUMENTS

2018/0136660 A1* 5/2018 Mudalige .............. G01S 13/931
2019/0138825 A1* 5/2019 Lee ..................... B60W 40/072

* cited by examiner

*Primary Examiner* — Jonathan M Dager
*Assistant Examiner* — Garrett F Evans
(74) *Attorney, Agent, or Firm* — Lorenz & Kopf LLP

(57) ABSTRACT

Methods and apparatus are provided for detecting and assigning objects to sensed values. An object detection arrangement includes a processor that is programmed to execute a first branch of instructions and a second branch of instructions. Each branch of instructions includes receiving a modality from at least one sensor of a group of sensors via a respective interface and determining an output value based on the modality. The object detection arrangement includes an association distance matrix. Modalities of different branches of instructions define different modalities of an object external to the object detection arrangement. The object detection arrangement cumulates the output values, and the association distance matrix associates an object to the cumulated output values to thereby detect and track the object external to the object detection arrangement.

18 Claims, 7 Drawing Sheets

LEARN ASSOCIATION FOR MULTI-OBJECT TRACKING WITH MULTI SENSORY DATA AND MISSING MODALITIES

INTRODUCTION

The description generally relates to detecting and tracking objects in the surroundings of an object detection arrangement. More particularly, the description relates to systems and methods for detecting and tracking objects in the surroundings of a vehicle, for example an autonomous vehicle or a vehicle that comprises at least partially automated or autonomously acting components.

In order for a vehicle to detect its surroundings and gather information about objects being located in the surroundings of a vehicle, several sensor systems are provided to obtain information via several sensing systems. For example, cameras are provided to obtain optical information like appearance of an object. Lidar-systems may be used to obtain information like dimensions and optionally appearance of an object. Radar-systems may be used to obtain accurate ranging and velocity information. The information from the Camera, Radar- and Lidar-systems can subsequently be used to detect and track an object to identify its moving path, be it an absolute moving path with respect to the environment or a relative moving path with respect to the subject vehicle.

While existing systems for detecting and tracking objects in the surroundings of a vehicle may be suitable for the present purposes, there may, however, exist a need for an interpretable, safe and robust data-driven object association for multi-sensor fusion and tracking.

SUMMARY

Apparatuses and methods for object detection and tracking, particularly for an autonomous vehicle, are provided.

In one embodiment, the apparatus is an object detection arrangement and comprises a processor that is programmed to execute a first branch of instructions and a second branch of instructions, and an association distance matrix. The first branch of instructions comprises receiving, via a first interface, a first modality from at least one sensor of a group of sensors comprising multiple sensors, and determining a first output value based on the first modality. The second branch of instructions comprises receiving, via a second interface, a second modality from at least one sensor of the group of sensors, and determining a second output value based on the second modality. The first modality and the second modality define different modalities of an object external to the object detection arrangement. The object detection arrangement is configured to cumulate the first output value and the second output value. The association distance matrix is configured to associate an object to the cumulated first output value and the second output value to thereby detect and track the object external to the object detection arrangement.

In various embodiments, the object detection arrangement is configured to determine at least one of the first modality and second modality based on sensor measurement values.

In various embodiments, the first modality is one of: an appearance, a dimension, a shape, a height over ground, a relative or absolute position indicated by two-dimensional or three-dimensional coordinates, or another feature of the object external to the object detection arrangement, and the second modality is one of: an appearance, a dimension, a shape, a height over ground, a relative or absolute position indicated by two-dimensional or three-dimensional coordinates, or another feature of the object external to the object detection arrangement, wherein the second modality is different from the first modality.

In various embodiments, each of the first interface and second interface is configured to receive an input value from at least one of an optical camera, a thermal camera, a Radar-sensor, a Lidar-sensor, and an ultrasonic sensor.

In various embodiments, the object detection arrangement is configured to receive the first modality and the second modality from same or different sensors of the group of sensors.

In various embodiments, the object detection arrangement is configured to determine the first modality based on sensor measurement values of a first subset of sensors of the group of sensors, wherein the first subset of sensors comprises at least two sensors of the group of sensors.

In various embodiments, the object detection arrangement is configured to determine the second modality based on sensor measurement values of a second subset of sensors of the group of sensors, wherein at least one sensor of the second subset of sensors is identical to a sensor of the first subset of sensors.

In various embodiments, each of the first branch of instructions and the second branch of instructions comprises determining a distance metric of the first modality and second modality, respectively, before the association distance matrix associates an object to the cumulated first output value and second output value.

In various embodiments, each of the first branch of instructions and the second branch of instructions comprises determining a normalized modality based on the determined distance metric of the first modality and second modality, respectively, before the association distance matrix associates an object to the cumulated first output value and second output value.

In various embodiments, each of the first branch of instructions and the second branch of instructions comprises applying a respective weighting factor to the normalized modality of each of the first branch of instructions and second branch of instructions to obtain the first output value and the second output value.

A vehicle is provided, comprising a group of sensors and an object detection arrangement. The object detection arrangement comprises a processor connected to the group of sensors and programmed to execute a first branch of instructions and a second branch of instructions, and an association distance matrix. The first branch of instructions comprises receiving a first measurement value from at least one sensor of the group of sensors via a first interface and determining a first modality based on the first measurement value, and determining a first output value based on the first modality. The second branch of instructions comprises receiving a second measurement value from at least one sensor of the group of sensors via a second interface and determining a second modality based on the second measurement value, and determining a second output value based on the second modality. The first modality and the second modality define different modalities of an object external to the object detection arrangement. The object detection arrangement is configured to cumulate the first output value and the second output value. The association distance matrix is configured to associate an object to the cumulated first output value and the second output value to thereby detect and track the object external to the object detection arrangement.

In various embodiments, the first modality is one of: an appearance, a dimension, a shape, a height over ground, a relative or absolute position indicated by two-dimensional or three-dimensional coordinates, or another feature of the object external to the vehicle, and the second modality is one of: an appearance, a dimension, a shape, a height over ground, a relative or absolute position indicated by two-dimensional or three-dimensional coordinates, or another feature of the object external to the vehicle, wherein the second modality is different from the first modality.

In various embodiments, the group of sensors comprises at least two different types of sensors of an optical camera, a thermal camera, a Radar-sensor, a Lidar-sensor, and an ultrasonic sensor.

In various embodiments, the object detection arrangement is configured to receive the first measurement value and the second measurement value from same or different sensors of the group of sensors.

In various embodiments, the object detection arrangement is configured to determine the first modality based on sensor measurement values of a first subset of sensors of the group of sensors, wherein the first subset of sensors comprises at least two different sensors of the group of sensors.

In various embodiments, the object detection arrangement is configured to determine the second modality based on sensor measurement values of a second subset of sensors of the group of sensors, wherein at least one sensor of the second subset of sensors is identical to a sensor of the first subset of sensors.

In various embodiments, each of the first branch of instructions and the second branch of instructions comprises determining a distance metric of the first modality and second modality, respectively, before the association distance matrix associates an object to the cumulated first output value and second output value.

In various embodiments, each of the first branch of instructions and the second branch of instructions comprises determining a normalized modality based on the determined distance metric of the first modality and second modality, respectively, before the association distance matrix associates an object to the cumulated first output value and second output value.

In various embodiments, each of the first branch of instructions and the second branch of instructions comprises applying a respective weighting factor to the normalized modality of each of the first branch of instructions and second branch of instructions to obtain the first output value and the second output value.

A method for detecting and tracking an object external to an object detection arrangement is provided. The method comprises the steps of: detecting, by a plurality of sensors, features of the object external to the object detection arrangement; determining, by a processor, a first modality and a second modality based on the detected features, wherein the first modality and the second modality define different modalities of the object external to the object detection arrangement; cumulating, by a processor, the first output value and the second output value; and associating, by a processor, an object to the cumulated first output value and the second output value to thereby detect and track the object external to the object detection arrangement.

In various embodiments, the method comprises steps that correspond to the functions of the object detection arrangement and/or the vehicle in accordance with one or more embodiments described above or hereinafter.

Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
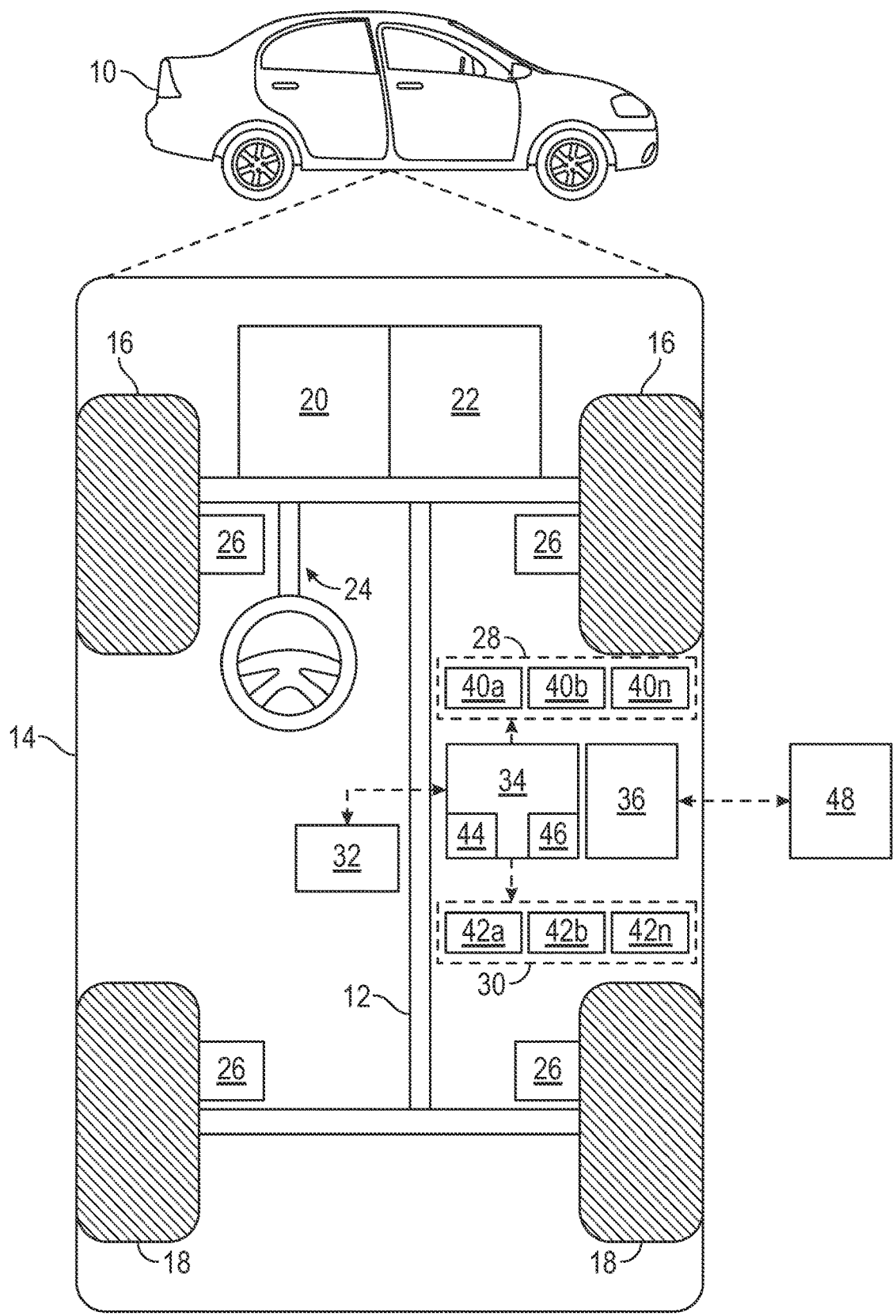
FIG. 1 schematically shows a system with an autonomous vehicle and a control device in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, windshield wipers, horn, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
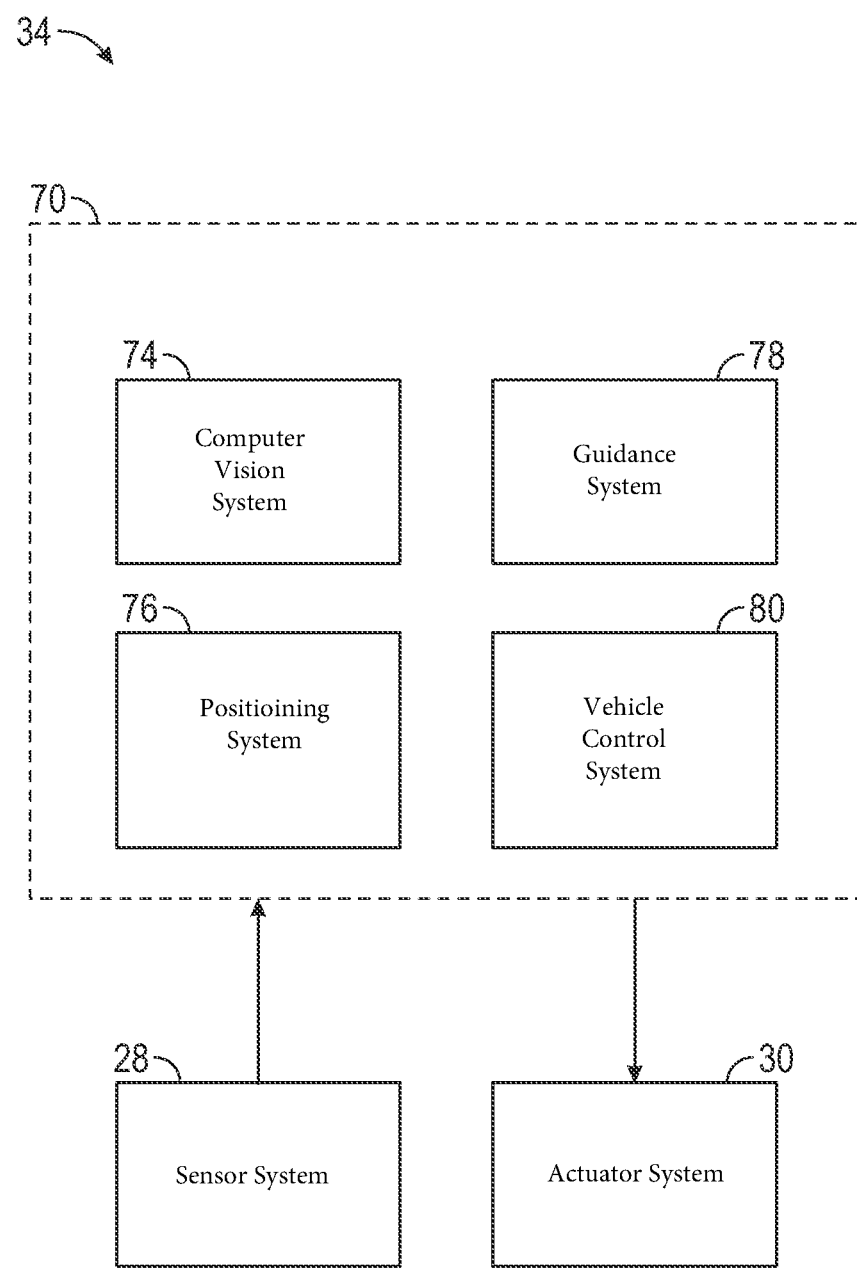
FIG. 2 schematically shows a controller of an autonomous vehicle in accordance with an embodiment.

In accordance with various embodiments, controller 34 implements an autonomous driving system (ADS) 70 as shown in FIG. 2. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 may also be referred to as a sensor fusion system, as it fuses input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

The controller 34 implements the steps of the method for detecting and tracking an object external to the vehicle 10 and also implements the functions of the object detection arrangement of one or more embodiments described herein. At least some of the steps of the method and the functions of the object detection arrangement may be implemented by the processor 44.

Figure 3:
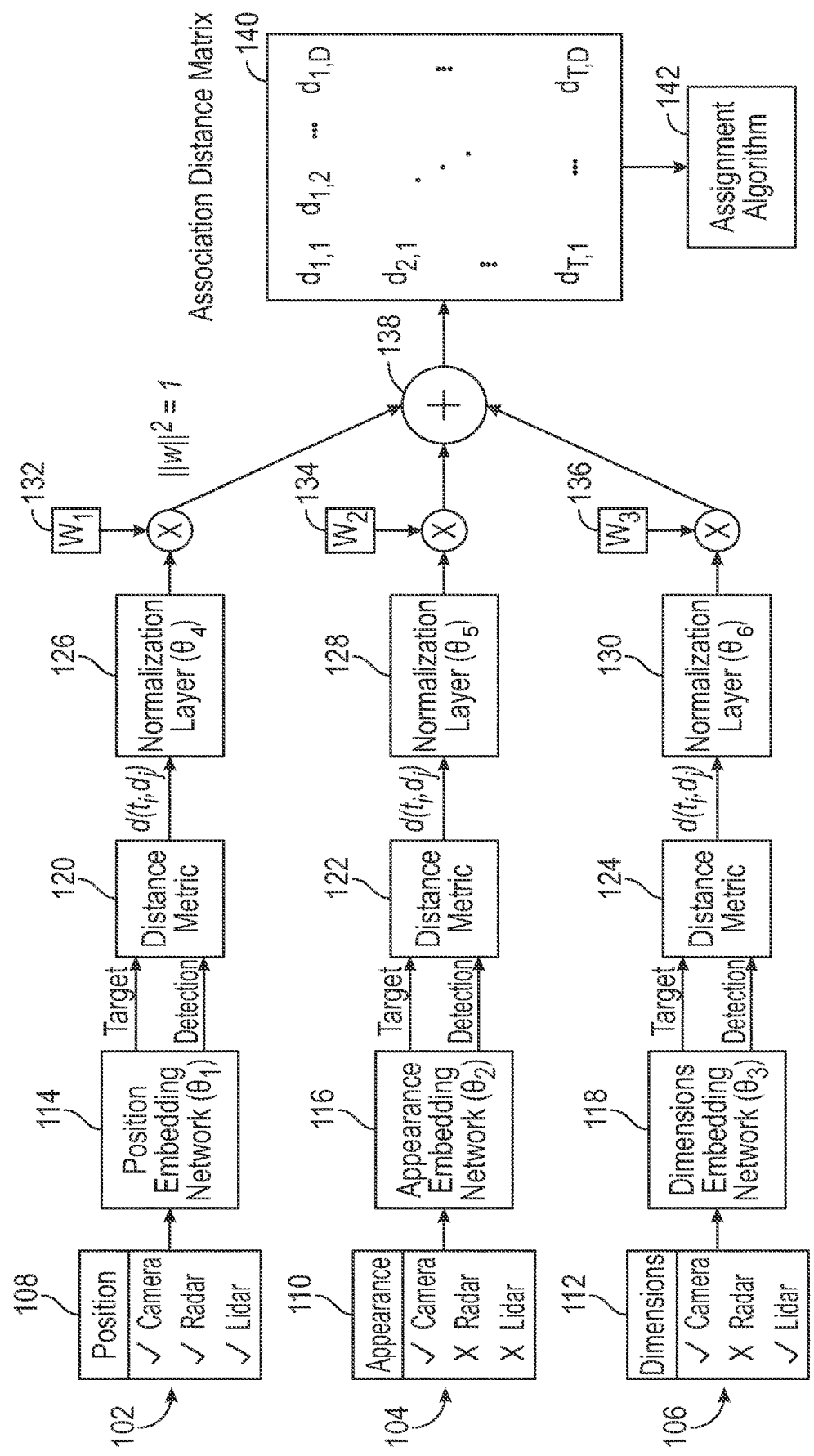
FIG. 3 schematically shows functional modules implementing the object detection arrangement in accordance with an embodiment.

FIG. 3 schematically shows functional modules implementing the object detection arrangement 100 in accordance with an embodiment. These functional modules are executed by controller 34 (FIG. 1, FIG. 2) when in operation. Detecting and tracking objects is of particular relevance for autonomous vehicles to allow the autonomous vehicles to sense their environment and act accordingly, i.e., to command the actuator system 30 based on the input received from the sensor system 28.

FIG. 3 schematically shows three branches of instructions (in the following, when reference is generally made to "branches", it is understood that these references relate to "branches of instructions" to be executed by a processor) for receiving and processing different modalities of external objects (i.e., objects external to the vehicle 10). A modality of an object is data describing a feature or characteristic of an object. The modality is extracted or derived from one or more sensor values and each branch (first branch 102, second branch 104, third branch 106) of the object detection arrangement 100 processes one modality. Of course, each branch may process the same modality of multiple detected objects. In the example of FIG. 3, the first branch 102 processes the position of an object, the second branch 104 processes the appearance of an object, and the third branch 106 processes the dimensions of an object. It is understood that the object detection arrangement may comprise more or less than three branches for processing more or less modalities.

Each branch 102, 104, 106 comprises a respective interface 108, 110, 112 to receive the modality to be processed. In the first branch 102, the position modality can be obtained from data originating from multiple different sensor types like an optical camera, a Radar, and/or a Lidar. In the second branch 104, the appearance modality is typically obtained from data of the optical camera only. In the third branch 106, the dimension modality is obtained based on data of the optical camera and the Lidar, for example. In other words, to obtain a modality, data from different types of sensors may be fused. The object detection arrangement 100 can handle scenarios with partial observability or even missing of some modalities.

Each branch 102, 104, 106 comprises a respective modality embedding network 114, 116, 118. The modality embedding network receives and processes one of the modalities to obtain a target value and a detection value. In each of the branches, the target value and detection value are supplied to a distance metric module 120, 122, 124 to determine a distance metric for each of the modalities. Then, the distance metric is provided to a normalization layer 126, 128, 130 to normalize the respective modality. The normalized modality is subsequently weighted or rated by multiplying it with a weighting factor w1, w2, w3 in the weighting module. The weighted modalities are cumulated by a summer and the cumulated value is supplied to the association distance matrix 140. Based on the association distance matrix 140, an assignment algorithm 142 assigns a detection event to an object.

In short, FIG. 3 describes a constrained network model of the object detection arrangement 100, induced by a normalized learned weighted sum of normalized learned metrics. Detection (sensor values, modalities) pass through a deep embedding network 114, 116, 118. A distance metric is calculated by modules 120, 122, 124 for all pairs of targets-detections for all active modalities (depending on the active sensor). All distances then pass a parametric normalization layer 126, 128, 130. The normalization layer learns the moments of the distance metric and then normalizes and constrains the distance. The vector of normalized distances is multiplied by a normalized learned weights vector. Each weight acts as the importance factors of each sensor. The weights themselves are normalized so that $\|w\|^2=1$.

The object detection arrangement 100 described herein does not necessarily handle the sensor values separately in different branches. Rather, it is the modalities that are handled in different branches to detect and track an object. As a consequence, different modalities might be determined based on same sensor values, see FIG. 3: position, appearance, dimensions all use sensor values from the optical camera while sensor values of the Radar are used only for the position modality in this example. The object detection arrangement 100 described herein does not distinguish between the source of a sensed value, but it distinguishes between different modalities of the sensed objects. This allows for an interpretable, safe and robust data-driven association for multi-sensor fusion and tracking. This approach does not require detection events of different sensors being synchronized with each other and achieves interpretability and robustness using a constrained network model.

Typically, object detection and tracking requires sensor synchronization, i.e., all detections of multiple sensors are aligned and all objects are already fused and co-detected by all sensor. The object detection arrangement 100 described herein does not require or assume synchronization between sensors. Sensors are treated as a black-box, assuming that each update step of the sensor inherently contains partial observability of some modalities. Therefore, high-level fusion in complex multi-sensor scenarios is allowed.

Figure 4:
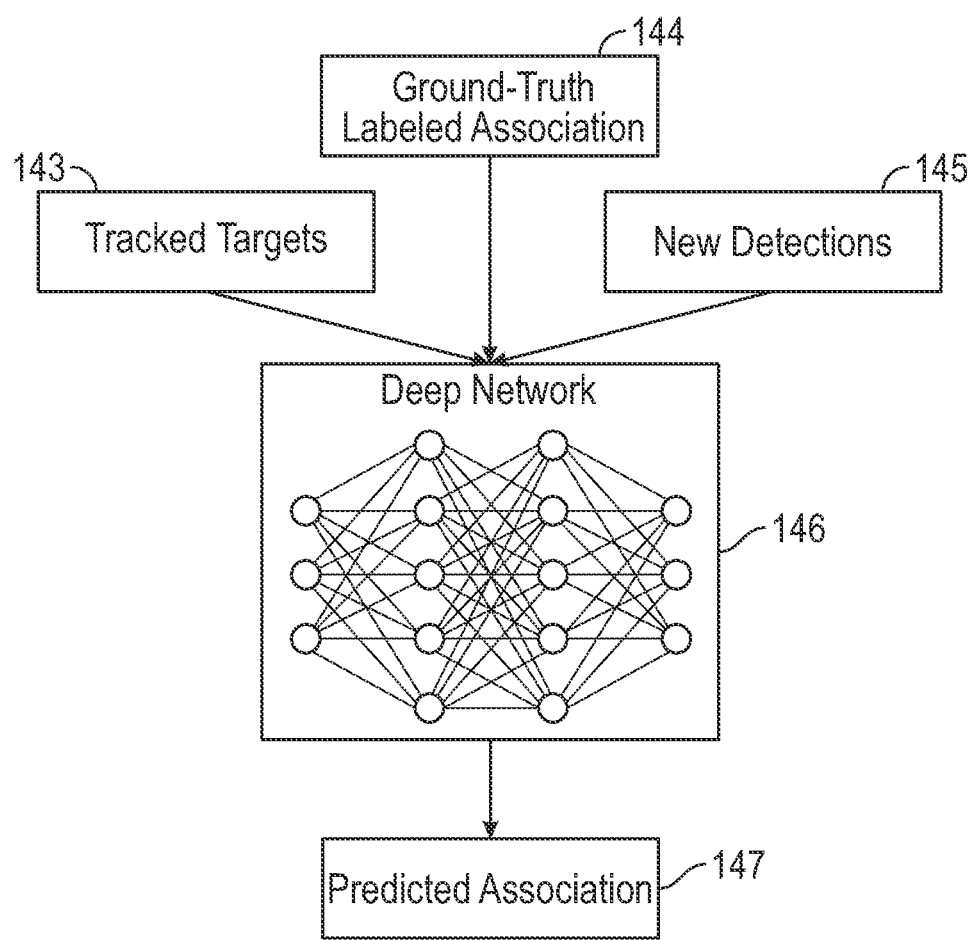
FIG. 4 schematically shows a training phase of the object detection arrangement in accordance with an embodiment.
Figure 5:
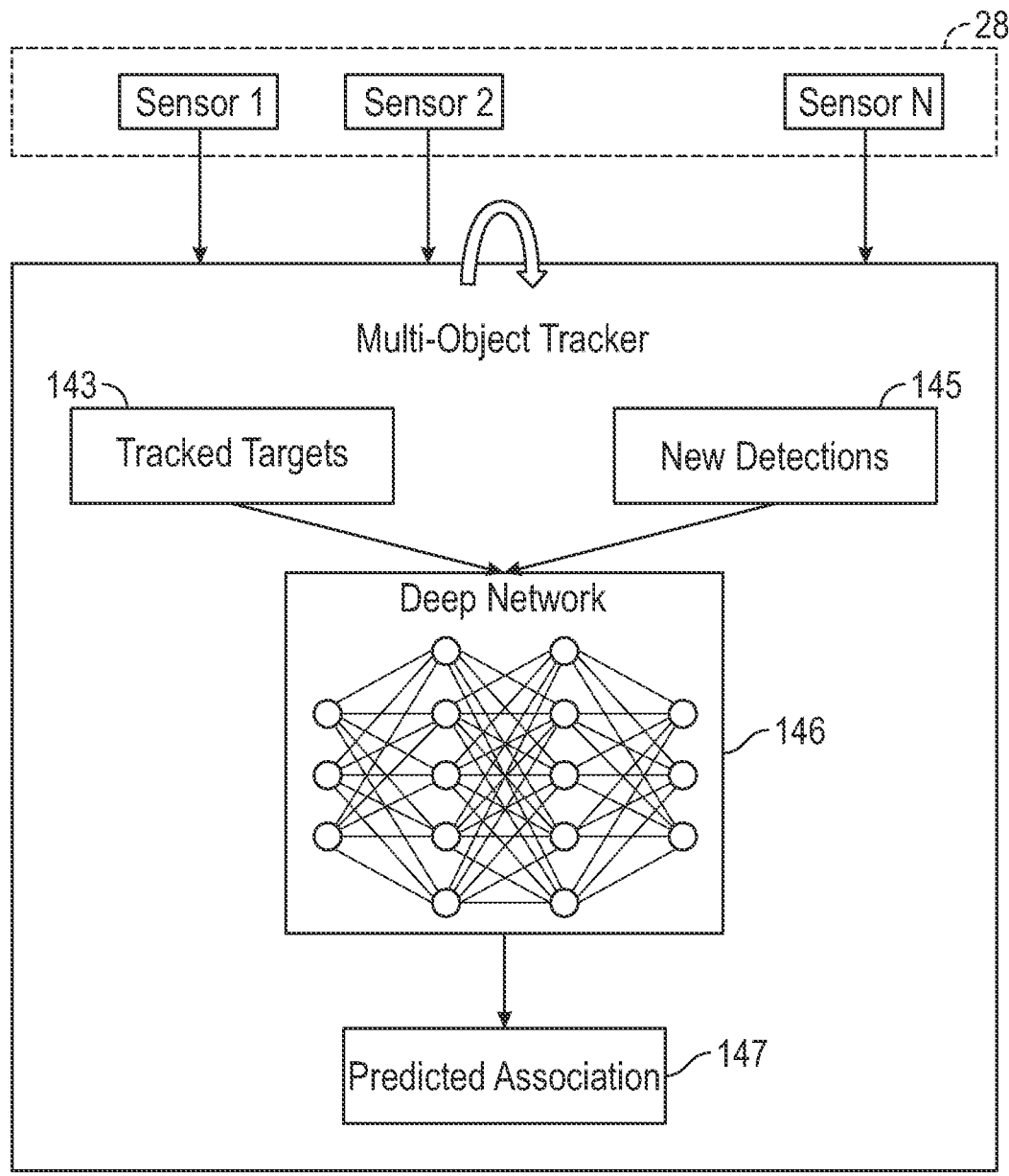
FIG. 5 schematically shows an inference phase of the object detection arrangement in accordance with an embodiment.

With reference now to FIGS. 4 and 5, training/learning and inference phases are shown. The object detection arrangement 100 uses machine learning and/or deep learning in order to detect and track objects by using modalities. The object detection arrangement 100 learns to predict the correct association, using a combination of essentially three elements: learning the association cost from demonstrations; learning an end-to-end differential network and directly optimizing the association problem by expressing its' formulation in the loss function; utilizing data (the modalities) from multiple sensors, while inherently assuming that not all inputs are sampled and available at all times.

FIG. 4 schematically shows the training phase of the object detection arrangement 100. The object detection arrangement 100 learns to predict the correct association in multi-sensor multi-modal setting with missing data from demonstrations. A dataset of correct associations is collected. The dataset contains samples of tracked targets 143, detections 145, and ground-truth labelled correct associations 144. The samples may be collected from multiple sources and various types of sensors 28 (see description of FIG. 1 for an exemplary listing of types of sensors). The samples may be collected from recordings of sensory data (optical camera, etc.) during driving the vehicle 10. The labelling pairs targets and their corresponding detections across frames in time. Based on the dataset with samples of tracked targets 143, new detections 145, and correct associations 144, a deep network 146 is trained to predict the correct association between targets and detections acquired by different sensors/sources of sensed values. The deep network 146 provides a predicted association 147.

The deep network 146 at least partially implements the functionality of the object detection arrangement 100 as described herein (for example with reference to FIG. 3). In one embodiment, the controller 34 and/or the processor 44 (FIG. 1) are configured to execute instructions to implement the functionality of the deep network 146.

FIG. 5 describes the object detection arrangement 100 on inference time. The deep network 146 receives data input from multiple sensors (Sensor 1, Sensor 2, Sensor N) of sensor system 28. The data input from the sensor system 28 is the basis to obtain different modalities (see FIG. 3) which are then processed in individual branches of the object detection arrangement 100. Input from the available sensors/modalities is fed into the deep network 146 which in turn provides the predicted association to the multi-object tracker. It is noted that some of the functional modules of FIG. 5 correspond to functional modules already described with reference to FIG. 4. These functional modules are not described again, and reference is made to FIG. 4 in this regard.

Figure 6:
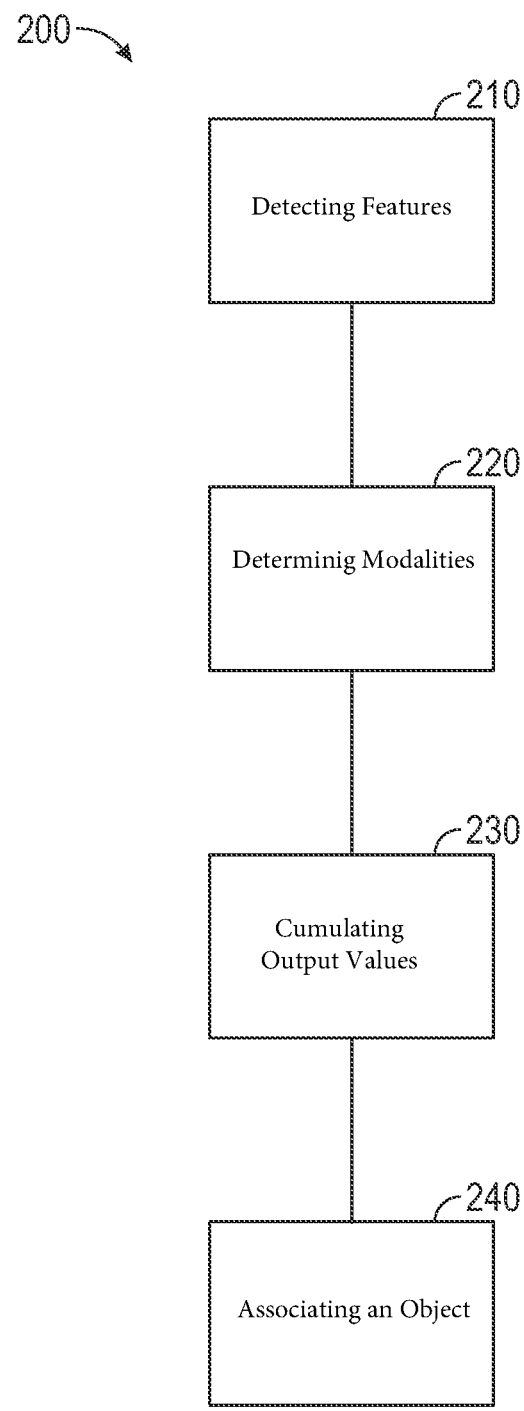
FIG. 6 schematically shows the steps of a method for object detection and tracking in accordance with an embodiment.

FIG. 6 schematically describes a method for detecting and tracking an object external to an object detection arrangement. The object detection arrangement 100 might be implemented within an autonomous vehicle 10. The method comprises the following steps: detecting, by a plurality of sensors 40a, 40b, 40n, features of the object external to the object detection arrangement 100 in a first step 210; determining, by a processor 44, a first modality and a second modality based on the detected features, wherein the first modality and the second modality define different modalities of the object external to the object detection arrangement 100 in a second step 220; cumulating, by a processor 44, the first output value and the second output value in a third step 230; and associating, by a processor 44, an object to the cumulated first output value and the second output value to thereby detect and track the object external to the object detection arrangement 100.

The method 200 may comprise additional steps and/or may modify the steps of the exemplary embodiment shown in and described with reference to FIG. 6. Particularly, the method may contain steps that correspond to the functions described with reference to the object detection arrangement 100 and the vehicle 10.

Figure 7:
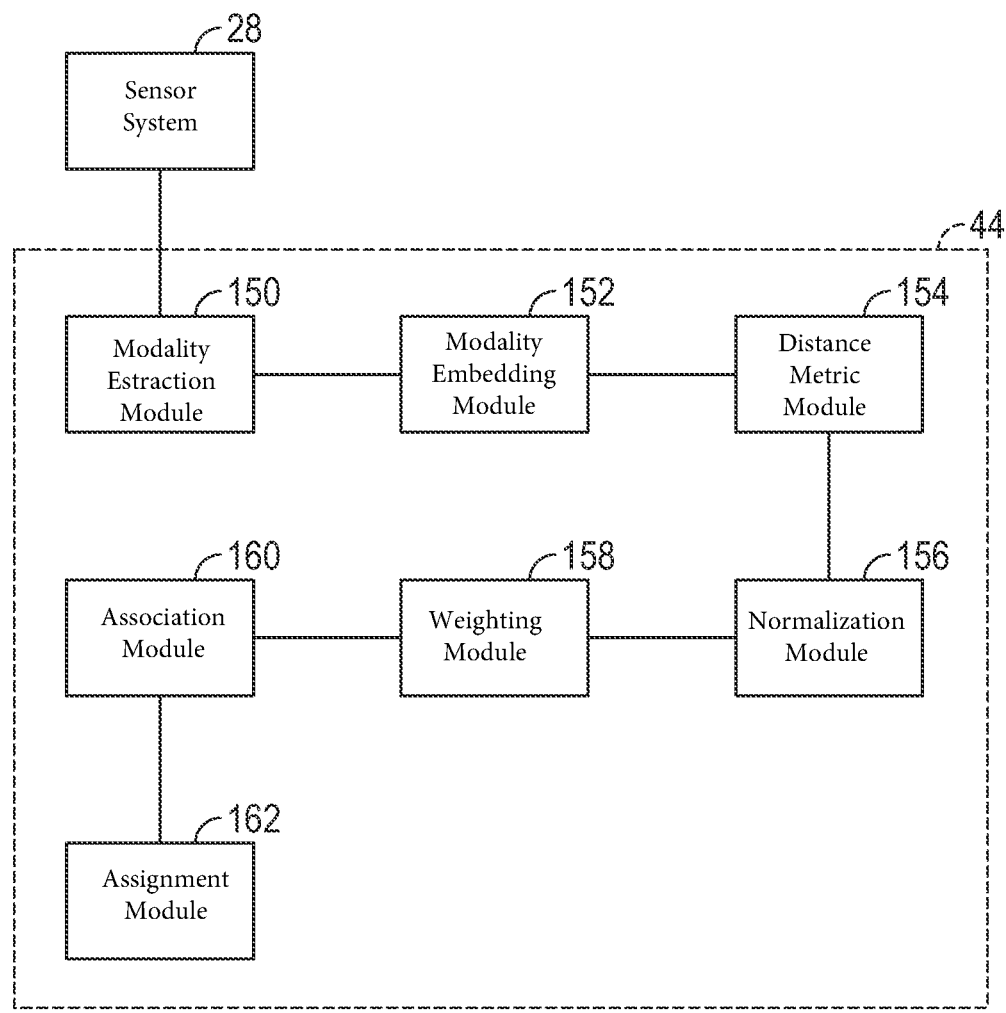
FIG. 7 schematically shows a processor implementing the functions of the object detection arrangement in accordance with an embodiment.

FIG. 7 shows an exemplary embodiment of the processor 44 (see FIG. 1) in accordance with an embodiment. The processor 44 implements several modules that execute the functions of the object detection arrangement 100 as exemplarily described with reference to FIG. 3.

A modality extraction module 150 receives data from a sensor system 28 comprising at least one sensor, more preferably multiple sensors of different types. The modality extraction module 150 processes the data from the sensor system 28 to obtain a modality that is the basis for processing by the subsequent modules. For example, the modality extraction module 150 extracts a position, an appearance, a dimension, etc., from the sensor data and provides the extracted modality to a modality embedding module 152. The modality embedding module 152 executes the function of the modality embedding networks 114, 116, 118 shown in FIG. 3 and provides pairs of targets and detections to a distance metric module 154.

The distance metric module 154 calculates a distance metric for all pairs of targets-detections for all active modalities and passes the distance metric on to the normalization module 156. The normalization module 156 learns the moments of the distance metric and then normalizes and constrains the distance and passes the normalized distance to the weighting module 158. The weighting module 158 multiplies the normalized distances by a normalized learned weights vector. Each weight acts as the importance factors of each sensor. The weights themselves are normalized so that the following applies: $\|w\|^2=1$. The cumulation and association module 160 cumulates and associates the weighted distances and provides the result thereof to the assignment module 162 which assigns an object to the weighted distances.

It is to be understood that the modules shown in FIG. 7 may describe a single branch 102, 104, 106 as shown in FIG. 3. However, the processor 44 may implement multiple instances of each of the modules shown in FIG. 7 so that the processor 44 implements multiple branches with one instance of each module per branch. Alternatively, the modules of FIG. 7 may be implemented so that they can handle multiple different modalities such that a single instance of each module of FIG. 7 can handle multiple modalities.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An object detection arrangement, comprising:
   a processor that is programmed to execute a first branch of instructions and a second branch of instructions;
   wherein the first branch of instructions comprises: receiving, via a first interface, a first modality that is based on first sensor measurement values from at least one first sensor of a group of sensors comprising multiple sensors, and determining a first output value based on the first modality;
   wherein the second branch of instructions comprises: receiving, via a second interface, a second modality that is based on second sensor measurement values from at least one second sensor of the group of sensors, and determining a second output value based on the second modality;
   an association distance matrix;
   wherein the first modality and the second modality define different modalities of an object external to the object detection arrangement;
   wherein the object detection arrangement is configured to cumulate the first output value and the second output value; and
   wherein the association distance matrix is configured to associate an object to the cumulated first output value and the second output value to thereby detect and track the object external to the object detection arrangement,
   wherein each of the first branch of instructions and the second branch of instructions comprises determining a distance metric of the first modality and second modality, respectively, before the association distance matrix associates an object to the cumulated first output value and second output value.

2. The object detection arrangement of claim 1, comprising a third branch of instructions that comprise:
   determining the first modality and the second modality based on the first and second sensor measurement values.

3. The object detection arrangement of claim 1,
   wherein the first modality is one of: an appearance, a dimension, a shape, a height over ground, a relative or absolute position indicated by two-dimensional or three-dimensional coordinates, or another feature of the object external to the object detection arrangement;
   wherein the second modality is one of: an appearance, a dimension, a shape, a height over ground, a relative or absolute position indicated by two-dimensional or three-dimensional coordinates, or another feature of the object external to the object detection arrangement;
   wherein the second modality is different from the first modality.

4. The object detection arrangement of claim 1,
   wherein each of the first interface and second interface is configured to receive an input value from at least one of an optical camera, a thermal camera, a Radar-sensor, a Lidar-sensor, and an ultrasonic sensor.

5. The object detection arrangement of claim 1,
   wherein the object detection arrangement is configured to receive the first modality and the second modality from same or different sensors of the group of sensors.

6. The object detection arrangement of claim 1,
   wherein the at least one first sensor comprises two sensors of the group of sensors.

7. The object detection arrangement of claim 6,
   wherein at least one second sensor is identical to one of the two sensors.

8. The object detection arrangement of claim 1,
   wherein each of the first branch of instructions and the second branch of instructions comprises determining a normalized modality based on the determined distance metric of the first modality and second modality, respectively, before the association distance matrix associates an object to the cumulated first output value and second output value.

9. The object detection arrangement of claim 8,
   wherein each of the first branch of instructions and the second branch of instructions comprises applying a respective weighting factor to the normalized modality of each of the first branch of instructions and second branch of instructions to obtain the first output value and the second output value.

10. A vehicle, comprising:
    a group of sensors;
    an object detection arrangement;
    wherein the object detection arrangement comprises:
    a processor connected to the group of sensors and programmed to execute a first branch of instructions and a second branch of instructions;
    wherein the first branch of instructions comprises: receiving a first measurement value from at least one sensor of the group of sensors via a first interface and determining a first modality based on the first measurement value, and determining a first output value based on the first modality;
    wherein the second branch of instructions comprises: receiving a second measurement value from at least one sensor of the group of sensors via a second interface and determining a second modality based on the second measurement value, and determining a second output value based on the second modality;
    an association distance matrix;
    wherein the first modality and the second modality define different modalities of an object external to the object detection arrangement;
    wherein the object detection arrangement is configured to cumulate the first output value and the second output value; and
    wherein the association distance matrix is configured to associate an object to the cumulated first output value and the second output value to thereby detect and track the object external to the object detection arrangement, wherein each of the first branch of instructions and the second branch of instructions comprises determining a distance metric of the first modality and second modality, respectively, before the association distance matrix associates an object to the cumulated first output value and second output value.

11. The vehicle of claim 10,
wherein the first modality is one of: an appearance, a dimension, a shape, a height over ground, a relative or absolute position indicated by two-dimensional or three-dimensional coordinates, or another feature of the object external to the vehicle;
wherein the second modality is one of: an appearance, a dimension, a shape, a height over ground, a relative or absolute position indicated by two-dimensional or three-dimensional coordinates, or another feature of the object external to the vehicle;
wherein the second modality is different from the first modality.

12. The vehicle of claim 10,
wherein the group of sensors comprises at least two different types of sensors of an optical camera, a thermal camera, a Radar-sensor, a Lidar-sensor, and an ultrasonic sensor.

13. The vehicle of claim 10,
wherein the object detection arrangement is configured to receive the first measurement value and the second measurement value from same or different sensors of the group of sensors.

14. The vehicle of claim 10,
wherein the object detection arrangement is configured to determine the first modality based on sensor measurement values of a first subset of sensors of the group of sensors;
wherein the first subset of sensors comprises at least two different sensors of the group of sensors.

15. The vehicle of claim 14,
wherein the object detection arrangement is configured to determine the second modality based on sensor measurement values of a second subset of sensors of the group of sensors;
wherein at least one sensor of the second subset of sensors is identical to a sensor of the first subset of sensors.

16. The vehicle of claim 10,
wherein each of the first branch of instructions and the second branch of instructions comprises determining a normalized modality based on the determined distance metric of the first modality and second modality, respectively, before the association distance matrix associates an object to the cumulated first output value and second output value.

17. The vehicle of claim 16,
wherein each of the first branch of instructions and the second branch of instructions comprises applying a respective weighting factor to the normalized modality of each of the first branch of instructions and second branch of instructions to obtain the first output value and the second output value.

18. A method for detecting and tracking an object external to an object detection arrangement, the method comprising the steps of:
detecting, by a plurality of sensors, features of the object external to the object detection arrangement;
determining, by a processor, a first modality and a second modality based on the detected features, wherein the first modality and the second modality define different modalities of the object external to the object detection arrangement;
determining a first output value based on the first modality;
determining a second output value based on the second modality;
cumulating, by a processor, the first output value and the second output value;
determining a distance metric of the first modality and second modality, respectively;
associating, by a processor, an object to the cumulated first output value and the second output value using an association distance matrix and the distance metrics to thereby detect and track the object external to the object detection arrangement.

* * * * *